United States Patent [19]
Campbell

[11] Patent Number: 5,924,745
[45] Date of Patent: Jul. 20, 1999

[54] CONNECTOR ASSEMBLY FOR AN EXPANDABLE SLOTTED PIPE

[75] Inventor: Alasdair Campbell, Ellon, United Kingdom

[73] Assignee: Petroline Wellsystems Limited, Scotland, United Kingdom

[21] Appl. No.: 08/952,958

[22] PCT Filed: May 24, 1996

[86] PCT No.: PCT/GB96/01250

§ 371 Date: Feb. 23, 1998

§ 102(e) Date: Feb. 23, 1998

[87] PCT Pub. No.: WO96/37681

PCT Pub. Date: Nov. 28, 1996

[30] Foreign Application Priority Data

May 24, 1995 [GB] United Kingdom .................... 9510465

[51] Int. Cl.$^6$ .............................. F16J 15/00; E21B 23/00
[52] U.S. Cl. ........................... 285/90; 285/333; 285/390; 405/43; 405/45; 138/119; 138/109; 138/177; 403/297; 403/309; 403/329; 166/207
[58] Field of Search ................................ 166/207, 242.7; 285/333, 355, 390, 35, 90; 403/297, 309, 313, 371, 329; 138/109, 119, 177; 405/43, 45; 29/451, 453, 456, 523

[56] References Cited

U.S. PATENT DOCUMENTS

| 2,633,374 | 3/1953 | Boice . |
| 3,689,113 | 9/1972 | Blaschke ................................. 285/90 |
| 4,349,050 | 9/1982 | Bergstrom et al. . |
| 4,626,129 | 12/1986 | Kothmann et al. ....................... 405/43 |

FOREIGN PATENT DOCUMENTS

| 41 33 802 | 10/1992 | Germany . |
| 792886 | 4/1958 | United Kingdom . |
| 92/01139 | 1/1992 | WIPO . |
| 93/25800 | 12/1993 | WIPO . |

*Primary Examiner*—Anthony Knight
*Assistant Examiner*—Gary Grafel
*Attorney, Agent, or Firm*—Alston & Bird LLP

[57] ABSTRACT

A connector assembly (20) for connecting expandable slotted tubing (EST) (10) comprises tubular first and second parts (22, 24) for mounting on the ends of respective lengths of slotted tubing. The parts (22, 24) are themselves slotted (26). The free end of the first part defines a male portion (28) and the free end of the second part defining a female portion (30), the free ends of the parts being adapted to engage with one another and to permit expansion of the coupled parts in a corresponding manner to the tubing (10).

23 Claims, 3 Drawing Sheets

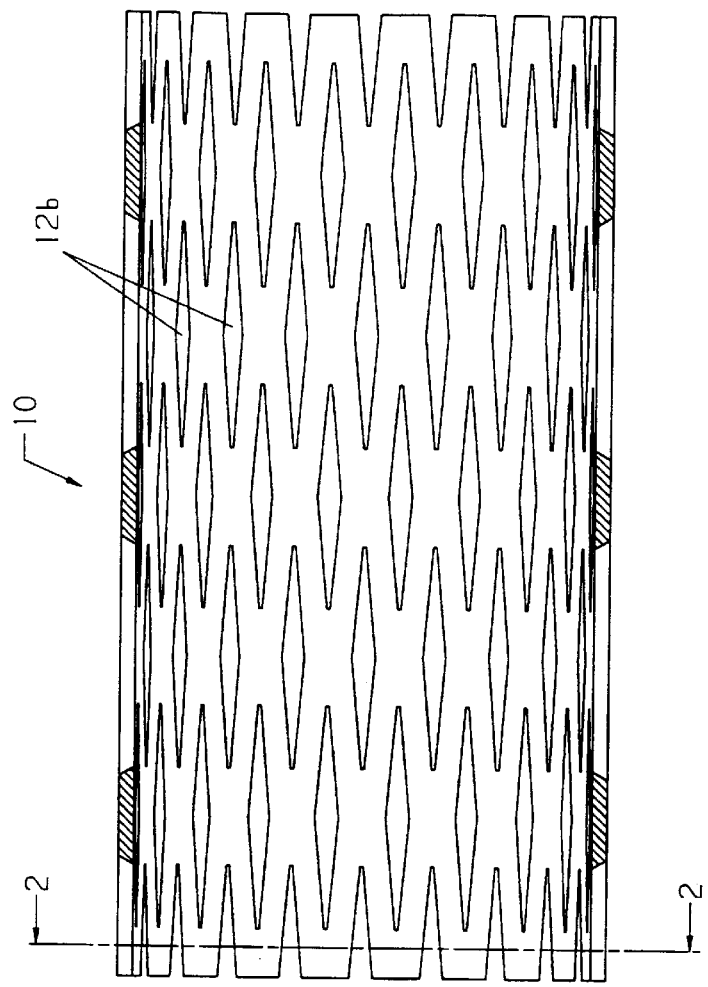
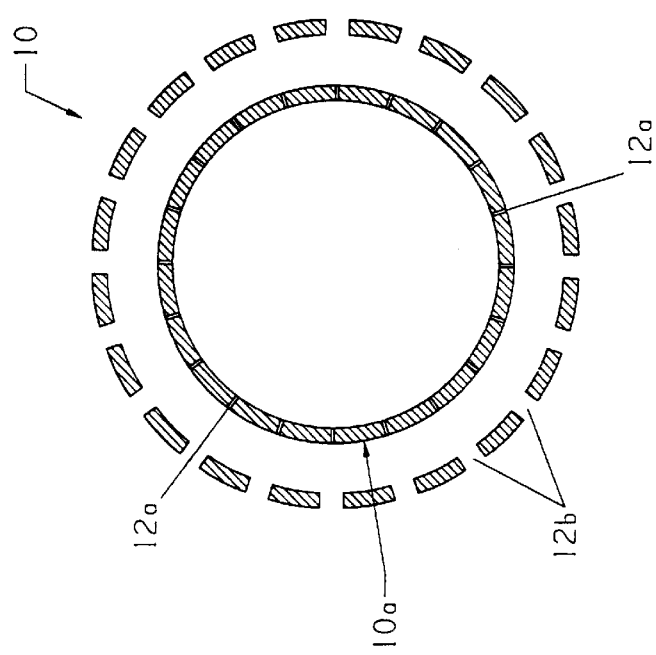

CONNECTOR ASSEMBLY FOR AN EXPANDABLE SLOTTED PIPE

This invention relates to a connector assembly for use in connecting sections of expandable tubing, and in particular but not exclusively for use in the connection of sections of expandable slotted tubing (EST) as utilised in downhole applications in the oil and gas exploration and extraction industries.

Expandable slotted tubing (EST), such as described in W093\25800 (Shell Internationale Research Maatschappij B.V.), may be used in various downhole applications. The tubing comprises lengths of tube which have been machined to create a large number of longitudinal slots. Thus, it is relatively easy to expand the tube radially outwardly by, for example, running a mandrel through the tubing. The expansion causes the slots to extend to create diamond-shaped apertures. The tubing is useful where it is desired to, for example, line a bore below a restriction without further reducing the diameter of the bore. Using conventional tubing the outer diameter of the tubing must, by necessity, be of smaller diameter than the restriction, to permit the tubing to be passed through the restriction. This reduction in the bore diameter has a number of significant effects, primarily in reducing the production capabilities of the bore. Using EST, the tubing may pass through a restriction into a reamed section of bore below the restriction. The tubing may then be expanded to a diameter larger than the restriction.

EST is supplied in lengths which are, at present, made up into a string by welding the lengths to one another. This is relatively time consuming and expensive and in many situations, for example in an off-shore operation in bad weather, it may be difficult to maintain consistent weld quality. Safety problems may also arise due to the high temperatures and exposed flames or sparks created by a welding operation. Further, in the event of a "mis-run", requiring the welded lengths of tube forming the EST string to be separated, the tubing must be cut, and the cut tubing may not be suitable for re-use.

It is among the objectives of the present invention to provide a means of connecting sections of EST which obviates or mitigates these difficulties.

According to the present invention there is provided a connector assembly for connecting expandable slotted tubing, the assembly comprising tubular first and second parts for mounting on the ends of respective lengths of slotted tubing, the parts being slotted and the free end of the first part defining a male portion and the free end of the second part defining a female portion such that the free ends of the parts are adapted to engage with one another and to permit expansion of the coupled parts in a corresponding manner to the tubing.

According to a further aspect of the present invention there is provided a method of connecting expandable slotted tubing, the method comprising:

providing first and second lengths of slotted tubing;
providing tubular slotted first and second parts on the ends of the respective tubing lengths, the free end of the first part defining a male portion and the free end of the second part defining a corresponding female portion; and
coupling said male and female portions to connect the first and second tubing lengths.

The invention further relates to a method of locating such connected lengths of slotted tubing in a bore, including the step of radially expanding the lengths of tubing and said first and second parts to form a length of expanded tubing of substantially constant internal diameter.

As used herein, the term "slotted" or "slots" is intended to encompass any cutting, machining or weakening of a tubular structure intended to facilitate radial expansion, including: slots which extend only partially through the tube wall and which permit the remaining thinned wall sections to fracture or extend; and lines of drilled holes.

The parts may be arranged with the respective slots aligned, though this is not considered essential to the successful expansion of the assembly.

Preferably, the parts define corresponding screw threads, such that the parts may be made up by relative rotation. Alternatively, the parts may be adapted to allow make up by stabbing in or most preferably by a combination of stabbing and rotation.

In a preferred arrangement fasteners are provided for securing the parts to one another; this prevents radial separation of the free ends of the parts when the connected tubing is expanded and prevents rotation of one part relative to the other. Most preferably, fasteners are located adjacent the free end of the outer female portion, to prevent the end from flaring outwardly on the tubing being expanded. The fasteners may be releasable, for example short screws for location in appropriate holes provided in the parts, such that the tubing may be separated in the event of a mis-run. The use of screws and the like, and the associated screw-holes, also provides a convenient means for ensuring that the parts are in a desired alignment.

Preferably also, the parts define corresponding threads and are also securable to one another by fasteners. Most preferably, the fasteners engage the female portion between the free end and the threaded portion thereof. This arrangement may be provided at any point in the slot pattern. In an alternative arrangement fasteners may also be provided to engage the male portion between the free end and the threaded portion thereof. With this arrangement it is preferred that threaded portions are located on the "nodes" of the parts, between the slot ends, that are not deformed by expansion of the assembly.

Preferably also, the portion of each part for engaging the free end of the other part includes an undercut ledge or groove, and the free end of the other part defines a tongue to locate in the groove. One or both of said portions may define a back angle to engage with a lip on the end of the other part. This minimises the possibility of the free ends flaring on expansion of the tube; such flaring of the male end would create an irregularity in the tubing bore on which tools might be snagged. Where the parts are threaded, the lipped free end of the male portion is preferably arranged to deflect inwardly to pass the female thread, and to allow the parts to be at least partially made-up by stabbing in. Such deflection may be accommodated by providing a living hinge on the male portion.

The parts may be formed integrally with the respective tubing lengths, or may be welded or otherwise secured thereto; the welding or securing operation may be carried out in a manufacturing or assembly facility, such that the tubing lengths may be delivered to sites ready for connection.

External shoulders may be provided on the connector assembly on one or both parts to facilitate handling of the assembly and the connected tubing. Preferably, the shoulders are provided at nodes of the parts.

These and other aspects of the present invention will now be described, by way of example, with reference to the accompanying drawings, in which:

FIG. 1 is a sectional view of a length of expandable slotted tubing (EST), shown in an expanded configuration;

FIG. 2 is a sectional view on line 2—2 of FIG. 1, and also shows the EST in unexpanded configuration;

Figure 3:
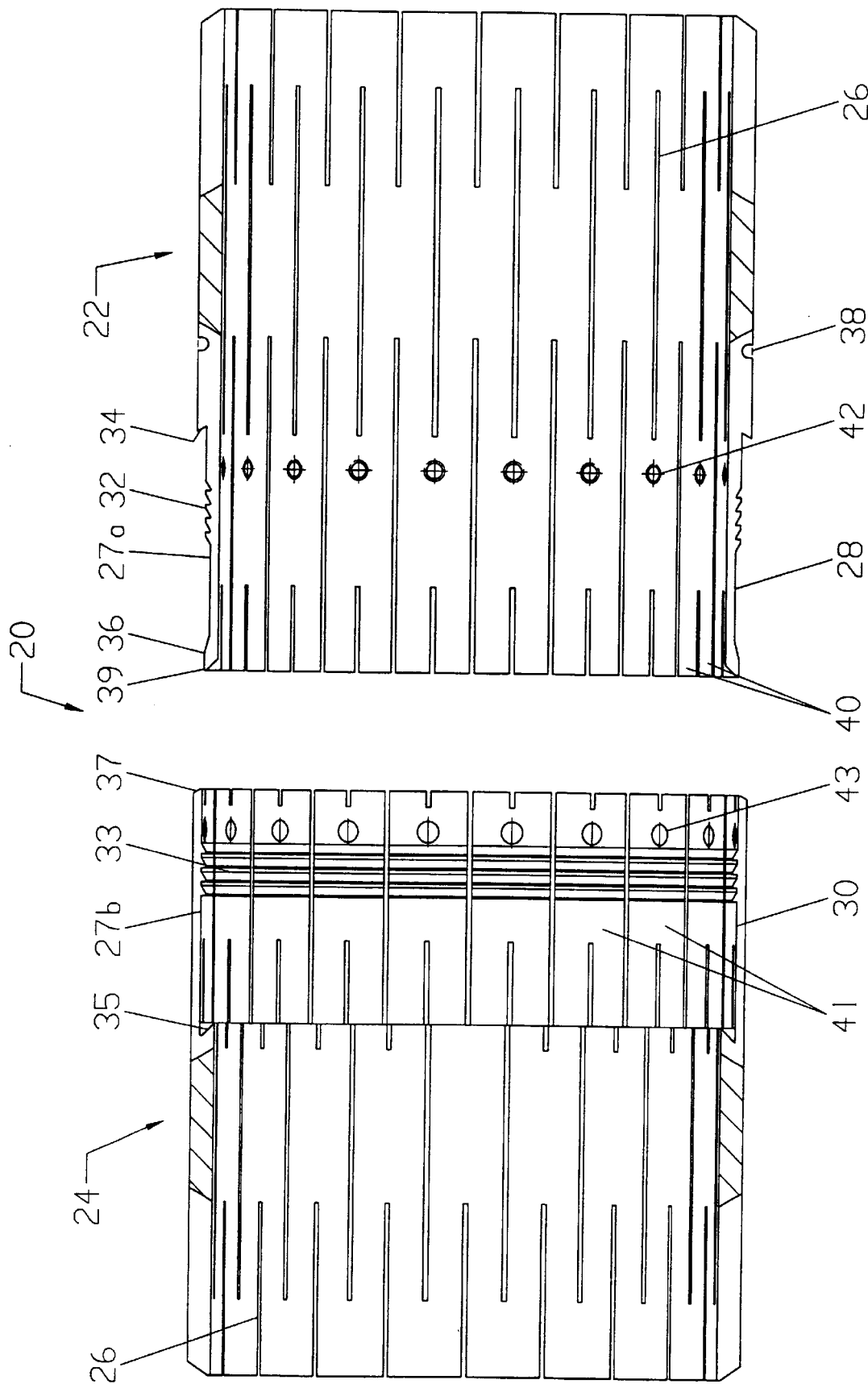
FIG. 3 is a half section of a connector assembly in accordance with a preferred embodiment of the present invention, with the parts of the assembly shown separated.

Reference is first made to FIGS. 1 and 2 of the drawings, which illustrate a length of expandable slotted tubing (EST) 10. In its initial configuration, the tubing 10 is simply a length of pipe in which a series of longitudinal slots 12 have been machined (shown as tube 10a with slots 12a in FIG. 2). Applying a radially outward force to the tubing wall, for example by passing a mandrel through the tubing, causes the tube to expand such that the slots 12a become diamond shaped openings 12b, as described in WO93/25800.

Figure 4:
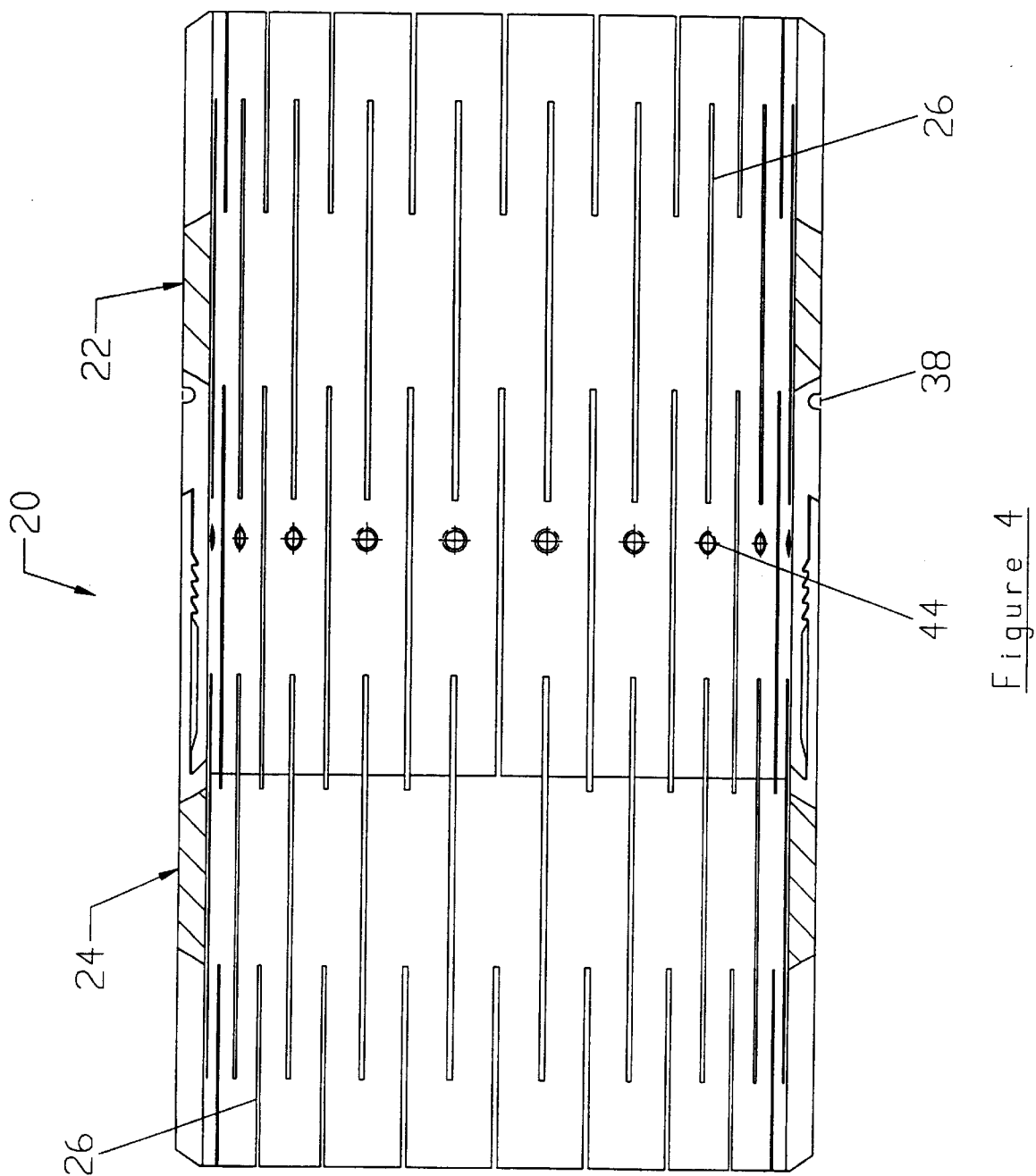
FIG. 4 is a half section of the connector assembly of FIG. 3, showing the parts connected.

The tubing 10 is supplied in lengths suitable for transportation and handling and these are joined to one another on surface to create a tubular string. The connector assembly 20 as illustrated in FIGS. 3 and 4 of the drawings is used to connect such tubing lengths. The assembly 20 comprises a first part 22 and a second part 24, which are mounted on the ends of the respective tubing lengths. In this particular example the parts 22, 24 are adapted to be welded to the tubing ends. The parts 22, 24 are intended to expand in a similar manner to the tubing 10, and as such are provided with similar longitudinal slots 26.

The free end of the first part 22 is machined to form a male portion 28 and the free end of the second part 22 defines a corresponding female portion 30 adapted to receive the male portion 28, as will be described. Both portions 28, 30 carry corresponding screw threads 32,33 such that the parts 22, 24 may be made up by relative rotation. The threads are located on the "nodes" 27a, 27b of the fingers 40, 41 formed by the slots 26, that is the areas between the slot ends which remain substantially undeformed following expansion of the assembly 20.

Each part 22, 24 also defines a respective undercut ledge 34, 35 for engaging the free end of the other part 36, 37, which is of corresponding form. The ledge 35 formed on the second part 24 defines a back angle and cooperates with a radially extending lip 39 on the free end of the first part 36. This serves to prevent the free ends of one part separating from the other part on expansion of the tubing. To permit the free end 36 of the first part to be deflected inwardly, allowing the lip 39 to pass within the screw thread 33 on the second part, the first part 22 defines a living hinge 38. It will be noted that the hinge 38 is spaced a relatively long distance from the free end 36, such that only small degree of deflection is necessary at the hinge 38 to allow the free end 36 to pass the screw threads 33.

As noted above, the slots 26 in the parts 22, 24 are arranged such that the free ends 36, 37 of the parts each define fingers 40, 41, and each of these fingers defines a hole 42, 43. The holes 43 in the second part are counter-sunk, whereas the holes 42 in the first part 22 are threaded such that the fingers 40, 41 may be secured to one another using a number of short screws 44. The screws 44 are located adjacent the free end of the second part, as the fingers 41 will have a tendency to flare outwardly on expansion of the tubing. In addition, a line of screws may also be provided on the other side of the threads 32, 33, and in this case it may not be necessary to provide a back angle on the ledge 35, as the additional set of screws will prevent the expanded fingers 40 from separating from the expanded part 24. If the back angle on the ledge 35 is not required, the radially extending lip 39 may be omitted and thus there is no requirement to provide the living hinge 38.

To connect two lengths of tubing provided with the tubing connector assembly 20, the parts 22, 24 are brought together, or stabbed in, such that the free end 36 of the first part passes inside the free end 37 of the second part, the end 36 being deflected inwardly to ride under the screw thread 33. Once the screw threads 32, 33 come together the first part 22 is rotated relative to the second part 24 until the parts 22, 24 are securely engaged. If necessary, the first part 22 is then rotated in the opposite direction to bring the holes 42, 43 into alignment, which also serves to bring the slots 26 in the parts 22, 24 into alignment. The screws 44 are then secured in the holes 42, 43.

The desired number of tubing sections are connected in this manner to form a string and run downhole to the desired location within the bore. The tubing and the connector assemblies may then be expanded to the desired diameter. However, in the event of a mis-run, requiring the tubing to be withdrawn and disassembled, this may be achieved relatively easily by removing the screws 44, unscrewing the first and second parts 22, 24 and then withdrawing the male portion 28 from the female portion 30.

It will be clear to those of skill in the art that the above-described embodiment is merely exemplary of the present invention, and may be subject to various modifications and improvements without departing from the scope of the invention.

I claim:

1. A connector assembly for connecting expandable slotted tubing, the assembly comprising tubular first and second parts for mounting on the ends of respective lengths of slotted tubing and having respective free ends, the parts being slotted and the free end of the first part defining a male portion and the free end of the second part defining a female portion, the free ends of the parts being engageable with one another and the first and second parts being expandable in a corresponding manner to the slotted tubing on which the parts are mounted.

2. The connector assembly of claim 1 wherein the parts are adapted to be coupled with the respective slots aligned.

3. The connector assembly of claim 1, wherein the parts define corresponding screw threads, such that the parts may be made up by relative rotation.

4. The connector assembly of claim 1, wherein the parts are adapted to allow make up by stabbing in.

5. The connector assembly of claim 1 wherein the parts define corresponding screw threads and are adapted to allow make up by a combination of stabbing in and rotation.

6. The connector assembly of claim 1 wherein fasteners are provided for securing the parts to one another.

7. The connector assembly of claim 6, wherein the fasteners are located adjacent the free end of the second part, to prevent the end from flaring outwardly on the tubing being expanded.

8. The connector assembly of claim 6, wherein the fasteners are releasable.

9. The connector assembly of claim 8, wherein the fasteners are screws for location in appropriate holes provided in the parts, such that the tubing may be separated in the event of a mis-run.

10. The connector assembly of claim 1 wherein the parts define corresponding threads and are also securable to one another by fasteners.

11. The connector assembly of claim 10, wherein the fasteners engage the female portion between the free end of the second part and the thread thereon.

12. The connector assembly of claim 11, wherein fasteners are also provided to engage the male portion between an undercut groove of the first part and the thread thereon.

13. The connector assembly of claim 1, wherein the parts define corresponding screw threads and the threads are located on nodes of the parts, which nodes experience minimal deformation on expansion of the parts.

14. The connector assembly of claim 1 wherein each part defines a portion for engaging the free end of the other part and each said portion includes an undercut groove, and the free end of the other part defines a tongue to locate in the groove.

15. The connector assembly of claim 14, wherein at least one of said portions defines a back angle to engage with a lip on the end of the other part.

16. The connector assembly of claim 15, wherein the free end of the male portion is provided with a lip and is deflectable inwardly to allow the parts to be at least partially made-up by stabbing in.

17. The connector assembly of claim 16, wherein said deflection is accommodated by providing a living hinge on the male portion.

18. The connector assembly of claim 1 wherein the parts are formed integrally with respective tubing lengths.

19. The connector assembly of claim 1, wherein the parts are adapted to be welded to the respective tubing lengths.

20. The connector assembly of claim 1 wherein external shoulders are provided on at least one of the parts to facilitate handling of the assembly and connecting tubing.

21. The connector assembly of claim 20, wherein the shoulders are provided at nodes of the parts.

22. A method of placing lengths of slotted tubing connected with the connector assembly of claim 1 in a bore, including the step of radially expanding the lengths of tubing and said first and second parts to form a length of expanded tubing of substantially constant internal diameter.

23. A method of connecting expandable slotted tubing, the method comprising:

providing first and second lengths of slotted tubing;

providing tubular slotted first and second parts on the ends of the respective tubing lengths, the free end of the first part defining a male portion and the free end of the second part defining a corresponding female portion; and coupling said male and female portions to connect the first and second tubing lengths.

* * * * *